United States Patent Office 3,651,074
Patented Mar. 21, 1972

3,651,074
CERTAIN 2-OXO-3-BENZOTHIAZOLINYL-
MALONYL COMPOUNDS
John Joseph D'Amico, Akron, Ohio, assignor to
Monsanto Company, St. Louis, Mo.
No Drawing. Filed Dec. 24, 1969, Ser. No. 888,063
Int. Cl. C07d 91/24
U.S. Cl. 260—304
6 Claims

ABSTRACT OF THE DISCLOSURE

Compounds of the formula

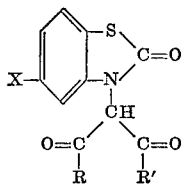

where X is hydrogen or chlorine, and R and R' are individually lower alkyl or lower alkoxy are disclosed. The new compounds are particularly useful as contact herbicides.

This invention relates to certain 2-oxo-3-benzothiazolines and their use as herbicides. The new compounds are characterized by a 2-oxo-3-benzothiazoline malonyl radical. They are phytotoxic which makes them useful for controlling undesirable vegetation.

The 2-oxo-3-benzothiazoline acetates are disclosed by Allen et al., J. Org. Chem. 13, 603 (1948) and by Nimmich, J. Prakt. Chem. 27, 220 (1965). The 4-chloro-derivatives are disclosed as herbicides in Godson et al., U.S. 3,069,429. The compounds of the present invention may contain chlorine in the 5 position but apparently the proximity of the chlorine atom to the imido nitrogen prevents formation of 4-chloro derivatives.

SUMMARY OF THE INVENTION

The 2-oxo-3-benzothiazolines of this invention have the formula:

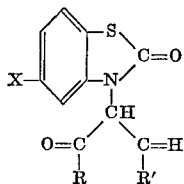

where X is hydrogen or chlorine, preferably hydrogen, and R and R' are individually lower alkyl or lower alkoxy, for example methyl, methoxy, ethyl, ethoxy, propyl, propoxy, isopropyl, isopropoxy, butyl, butoxy, sec. butyl, sec. butoxy, amyl or amyloxy.

DESCRIPTION OF THE PREFERRED EMBODIMENTS

The compounds of this invention are prepared by reaction of an alkali metal salt of 2-hydroxybenzothiazole with reactants selected from the group consisting of α-halodiketones, esters of halo-malonic acid, or esters of alpha-halo acetoacetic acid. Their preparations are shown in greater detail below.

EXAMPLE 1

Diethyl 2-oxo-3-benzothiazoline malonate is prepared by adding in one portion 59.8 grams (0.25 mole) of bromoethylmalonate to a mixture containing 37.8 grams (0.25 mole) of 2-hydroxybenzothiazole and 16.5 grams (0.25 mole) 85% KOH in 250 ml. of acetone at 30° C. After the addition, the temperature rises to 54° C. The reaction mixture is refluxed for 24 hours at 55–56° C. After cooling to 25° C., 300 ml. of water and 500 ml. of ethyl ether are added to the reaction mixture and stirred for 15 minutes. The resulting mixture is filtered to remove impurities, and the ether layer of the filtrate recovered. The ether solution is washed with water until neutral and then dried over sodium sulfate. The ether is removed in vacuo at the maximum temperature of 80–90° C. at 1–2 mm. 53 grams (69% yield) of the desired malonate are recovered as an amber oil. Analysis of the product gives 4.62% nitrogen and 10.8% sulfur compared to 4.53% nitrogen and 10.37% sulfur calculated for $C_{14}H_{15}NO_5S$

EXAMPLE 2

Diethyl 5-chloro-2-oxo-3-benzothiazoline malonate is prepared by adding in one portion 38.8 grams (0.162 mole) of bromo-ethylmalonate to a mixture containing 27.9 grams (0.15 mole) of 5-chloro-2-hydroxybenzothiazole and 0.9 grams (0.15 mole) 85% KOH in 300 ml. of acetone at 30° C. After the addition, the temperature rises to 39° C. The mixture is heated at reflux for 24 hours. After cooling the mixture to 20° C., 400 ml. of water and 500 ml. of ethyl ether are added and stirred for 15 minutes. After filtering to remove impurities, the ether layer is separated and washed with water until neutral and is dried over sodium sulfate. The ether is then removed in vacuo at the maximum temperature of 80–90° C. at 1–2 mm. The residue is filtered hot to remove a small amount of solids. 46 grams (89% yield) of the desired product, a viscous oil, are recovered. Analysis gives 3.76% nitrogen and 10.34% chlorine compared to 4.07% nitrogen and 10.31% chlorine calculated for $C_{14}H_{14}ClNOS$. The preparation is repeated to yield the same product containing 9.27% sulfur compared to the theoretical value of 9.33% sulfur.

EXAMPLE 3

Ethyl-alpha-acetyl-2-oxo-3-benzothiazoline acetate is prepared by adding 41.1 grams (0.25 mole) of ethyl-alpha-chloroacetoacetate in one portion to a mixture of 37.8 grams (0.25 mole) of 2-hydroxybenzothiazole and 16.5 grams (0.25 mole) 85% KOH in 300 ml. of acetone at 30° C. The temperature rises to 38° C. The mixture is refluxed for 24 hours at 55–56° C. The mixture is then cooled to 0° C. and 600 grams of ice water are added. The resulting slurry is stirred for one hour between 0–10° C. after which the precipitate is collected by filtration. The solid product is washed with water until neutral and air-dried at 25–30° C. 54 grams (78% yield) of the desired product are recovered. The structure of the product is confirmed by infrared spectral analysis. Recrystallized from alcohol, the compound melts at 94–96° C. Elemental analysis gives 5.13% nitrogen and 11.85% sulfur compared to 5.02% nitrogen and 11.48% sulfur calculated for $C_{13}H_{13}NO_4S$.

EXAMPLE 4

3 - (1-acetylacetonyl)-2-benzothiazolinone is prepared by the method of Example 3 except 36.1 grams (0.25 mole) of 3-chloro-2,4-pentanedione are used in place of ethyl alpha chloroacetoacetate. 43 grams (69.5% yield) of the above named compound are recovered. The compound identity is confirmed by infrared spectral analysis. Recrystallized from alcohol, the compound melts at 120–121° C. Analysis gives 5.83% nitrogen and 13.20% sulfur compared to 5.62% nitrogen and 12.86% sulfur calculated for $C_{12}H_{11}NO_3S$.

The new compounds are plant toxicants; and undesirable vegetation is controlled by applying phytotoxic quantities of them to the area to be protected. Thus, the toxicants may be applied to the soil medium or to the foliage of undesired vegetation. They are especially toxic toward broadleaf plants and some of them are also toxic toward grasses, yet crop plants such as corn, wheat and rice are unharmed. Some of the new compounds show marked specificity toward broadleaf plants while others demonstrate specificity among the grasses.

Certain compounds have both pre-emergence and post-emergence phytotoxic activity toward plants. Post-emergence activity, sometimes called contact activity, is the herbicidal effect observed when the toxicant is applied directly to the foliage. Pre-emergence activity is the herbicidal effect observed when the toxicant is applied directly to the soil after the seeds are planted but before the seeds have germinated or emerged.

The new plant toxicants may be applied conveniently in the form of a spray containing the active ingredient in a concentration within the range of 0.01–95.0% by weight. For post-emergence control of plants, amounts within the range of ¼ to 50 pounds per acre may be used. Thorough coverage of the foliage is recommended for effective control. For pre-emergence control of plants, amounts within the range of ¼ to 100 pounds per acre may be used.

Although the compounds of this invention are insoluble in water, they are soluble in common organic solvents. Most of them are soluble in acetone, chloroform, ethyl alcohol, ethyl acetate, benzene, ether and heptane. The compounds may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or other dispersing and wetting agents. Formulation of dry compositions is accomplished by mixing with finely divided solid carriers. Suitable carriers comprise talc, clay, pyrophyllite, silica and fuller's earth. Usually the toxicant is only a minor proportion. The dry formulation may be used as a dust or dispersed in aqueous medium before application. If the latter, it is convenient to incorporate a wetting or dispersing aid into the formulation.

The active ingredients provided by the present invention may be formulated as follows.

Type of formulation: Concentration of active ingredient, percent
(1) Granules of relatively large particle size _____ 5–30
(2) Powdery dusts _____ 2–80
(3) Wettable powders _____ 2–80
(4) Emulsifiable concentrates _____ 5–95
(5) Solutions _____ .01–95
(6) One of the less common types of formulations depending on the desired mode of application _____ .01–95

The compounds of this invention may be used alone or in combination with other agricultural chemicals. The new compounds can be applied in compositions comprising fertilizers, insecticides, fungicides, nematocides and other herbicides. Suitable formulations may include as other active ingredients ureas, carbamates, thiolcarbamates, dithiocarbamates, thionocarbamates, phenoxyacetic acid derivatives, benzoic acid derivatives, phenol derivatives and triazines. Compositions comprising one or more compounds of ths invention with other biologically active ingredients are extremely useful. One obvious advantage of using such combinations is the accomplishment of combined objectives with a single application, thereby eliminating the need for separate applications. This is particularly advantageous when using two herbicides each having specificity for different species of noxious plants.

Contact herbicidal properties are determined by application of a spray containing a given concentration of the active ingredient to the foliage of a mixture of approximately 14 or 21 day old grasses and broadleaved plants. Approximately fourteen days later the extent of injury to the plants is observed. A rating of 0 indicates no phytotoxicity, 1 slight, 2 moderate, 3 severe phytotoxicity and a rating of 4 indicates that the plants are dead.

Pre-emergence herbicidal properties are determined by applying the toxicant to soil containing seeds of the plants to be tested. About fourteen days after application of the chemicals to freshly seeded pans, the pre-emergence activity is observed and recorded. The number of plants of each species which germinated and grew is counted and converted to phytotoxicity ratings. The phytotoxicity ratings are assigned in accordance with the following conversion scale:

| Percent emergence | Phytotoxicity rating |
| --- | --- |
| 0–25 | 3 or severe. |
| 26–50 | 2 or moderate. |
| 51–75 | 1 or slight. |
| 76–100 | 0 or none. |

The contact herbicial activity by contacting test plants with a spray containing 0.2 percent concentration of the toxicants at a rate of approximately four pounds per acre is recorded in Table I.

TABLE I.—CONTACT PHYTOTOXICITY RATINGS

| Test plant | Toxicant | | |
| --- | --- | --- | --- |
| | Example 1[1] | Example 3[2] | Example 4[3] |
| Morning glory | 3 | 3 | 4 |
| Wild oat | 0 | 1 | 3 |
| Brome grass | 0 | 1 | 2 |
| Rye | 0 | 1 | 2 |
| Radish | 3 | 4 | 4 |
| Sugar beet | 3 | 4 | 4 |
| Cotton | 3 | 3 | 3 |
| Corn | 1 | 1 | 1 |
| Foxtail | 0 | 2 | 2 |
| Barnyard grass | 0 | 2 | 1 |
| Crabgrass | 0 | 1 | 2 |
| Pigweed | 4 | 4 | 4 |
| Soybean | 2 | 2 | 3 |
| Wild buckwheat | 4 | 4 | 4 |
| Tomato | 4 | 2 | 4 |
| Sorghum | 0 | 2 | 1 |
| Rice | 0 | 1 | 1 |

[1] X=H; R and $R_1$=O$C_2H_5$.
[2] X=H; R=$CH_3$; $R^1$=O$C_2H_5$.
[3] X=H; R and $R_1$=$CH_3$.

It will be noted that Example 1 is specifically phytotoxic toward broadleaf plants with little or no affect on grassy plants. The phytotoxicity ratings of the compounds of Examples 3 and 4 indicate that as the alkoxy groups are replaced with alkyl groups the toxicity toward broadleaf plants is retained but the toxicity toward the grassy plants increase.

Further illustration of the broadleaf activity is illustrated in Table II. Test plants are contacted with a spray containing 0.2 percent concentration of the 5-chloromalonate of Example 2 at a rate of approximately four pounds per acre.

TABLE II

Contact phytotoxicity ratings

| Test plant: | Toxicant of Example 2 |
|---|---|
| Wild oat | 0 |
| Brome grass | 1 |
| Sugar beet | 3 |
| Cotton | 2 |
| Corn | 2 |
| Barnyard grass | 1 |
| Crab grass | 3 |
| Pigweed | 4 |
| Rice | 0 |
| Cocklebur | 2 |
| Lambsquarter | 4 |
| Smartweed | 4 |
| Wheat | 0 |
| Velvet leaf | 2 |
| Coffeeweed | 3 |

The pre-emergent herbicidal activity of the compounds of this invention is demonstrated by applying the toxicants to soil seeded with the test plants at the rate of ten pounds per acre. The data are shown in Table III.

TABLE III.—PRE-EMERGENCE PHYTOTOXICITY RATINGS

| Test plants | Toxicant | | | |
|---|---|---|---|---|
| | Example 1 | Example 2 | Example 3 | Example 4 |
| Morning glory | 2 | 1 | 0 | 0 |
| Wild oat | 1 | 0 | 0 | 2 |
| Brome grass | 0 | 0 | 1 | 2 |
| Rye grass | 1 | 0 | 1 | 2 |
| Radish | 0 | 1 | 0 | 0 |
| Sugar beet | 2 | 1 | 2 | 1 |
| Foxtail | 1 | 0 | 0 | 3 |
| Crabgrass | 3 | 0 | 3 | 3 |
| Pigweed | 3 | | 1 | 3 |
| Soybean | 2 | 1 | 3 | 0 |
| Wild buckwheat | 1 | 3 | 0 | 0 |
| Tomato | 3 | 3 | 3 | 3 |
| Sorghum | 2 | 0 | 0 | 3 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. Compounds of the formula

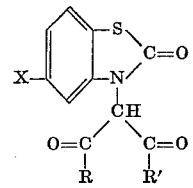

whre X is hydrogen or chlorine, and R and R' are individually lower alkyl or lower alkoxy.

2. A compound of claim 1 wherein X is hydrogen.
3. A compound of claim 2 where R and $R_2$ are ethoxy.
4. A compound of claim 2 where R and R' are methyl.
5. A compound of claim 2 where R is ethoxy and R' is methyl.
6. A compound of claim 1 where X is chlorine and R and R' are ethoxy.

No references cited.

ALEX MAZEL, Primary Examiner

R. J. GALLAGHER, Assistant Examiner

U.S. Cl. X.R.

71—90

UNITED STATES PATENT OFFICE
CERTIFICATE OF CORRECTION

Patent No. 3,651,074     Dated March 21, 1972

Inventor(s) John Joseph D'Amico

It is certified that error appears in the above-identified patent and that said Letters Patent are hereby corrected as shown below:

Column 2, line 19 "10.8%" should read --10.89%--; line 30 "0.9" should read --9.9--; line 43 the formula should read --$C_{14}H_{14}ClNO_5S$--

Column 4, line 5 "ths" should read --this--

Column 6, line 22 "whre" should read --where--; line 25 "$R_2$" should read --R'--

Signed and sealed this 29th day of May 1973.

(SEAL)
Attest:

EDWARD M. FLETCHER, JR.
Attesting Officer

ROBERT GOTTSCHALK
Commissioner of Patents